March 3, 1959  LA VERNE B. RAGSDALE ET AL  2,875,809
SEAT ADJUSTER
Filed June 20, 1956  5 Sheets-Sheet 1

Inventors
LaVerne B. Ragsdale
& Akira Tanaka
Paul Fitzpatrick
Attorney

March 3, 1959 LA VERNE B. RAGSDALE ET AL 2,875,809
SEAT ADJUSTER
Filed June 20, 1956 5 Sheets-Sheet 2

Inventors
LaVerne B. Ragsdale
& Akira Tanaka
By Paul Fitzpatrick
Attorney

March 3, 1959  LA VERNE B. RAGSDALE ET AL  2,875,809
SEAT ADJUSTER

Filed June 20, 1956  5 Sheets-Sheet 4

Inventors
La Verne B. Ragsdale
& Akira Tanaka
By Paul Fitzpatrick
Attorney

March 3, 1959    LA VERNE B. RAGSDALE ET AL    2,875,809
SEAT ADJUSTER
Filed June 20, 1956    5 Sheets-Sheet 5

Inventors
LaVerne B. Ragsdale
& Akira Tanaka
By Paul Fitzpatrick
Attorney

United States Patent Office 2,875,809
Patented Mar. 3, 1959

2,875,809

SEAT ADJUSTER

La Verne B. Ragsdale, Dearborn, and Akira Tanaka, Detroit, Mich., assignors to General Motors Corporation, Detroit, Mich., a corporation of Delaware Application June 20, 1956, Serial No. 592,655

3 Claims. (Cl. 155—14)

This invention relates to a seat adjuster, and more particularly to a fore and aft vertically movable seat adjuster for an automobile.

One feature of the invention is that it provides an improved seat adjuster; another feature of the invention is that it provides a novel seat adjuster having fore and aft and vertical adjusting means; a further feature of the invention is that the seat frame is pivotally mounted at its front side on the fore and aft adjusting means and the rear side of the seat frame is connected to motor driven means for raising and lowering the rear side of the seat frame relative to the adjusting means; still a further feature is that the seat moves fore and aft on an inclined track to eliminate the necessity for independent vertical adjusting means at the front side of the seat; a further feature of the invention is that it includes adjusting means for the rear side of the seat frame comprising a bell crank lever pivoted on the fore and aft adjusting means adjacent the rear side of the seat frame, means pivotally connecting one arm of the bell crank lever to the seat frame adjacent the rear side thereof and motor means connected to another arm of said bell crank lever for raising and lowering the rear side of the seat frame relative to the adjusting means.

Other features and advantages of the invention will be apparent from the following description and from the drawings, in which.

Figure 1:
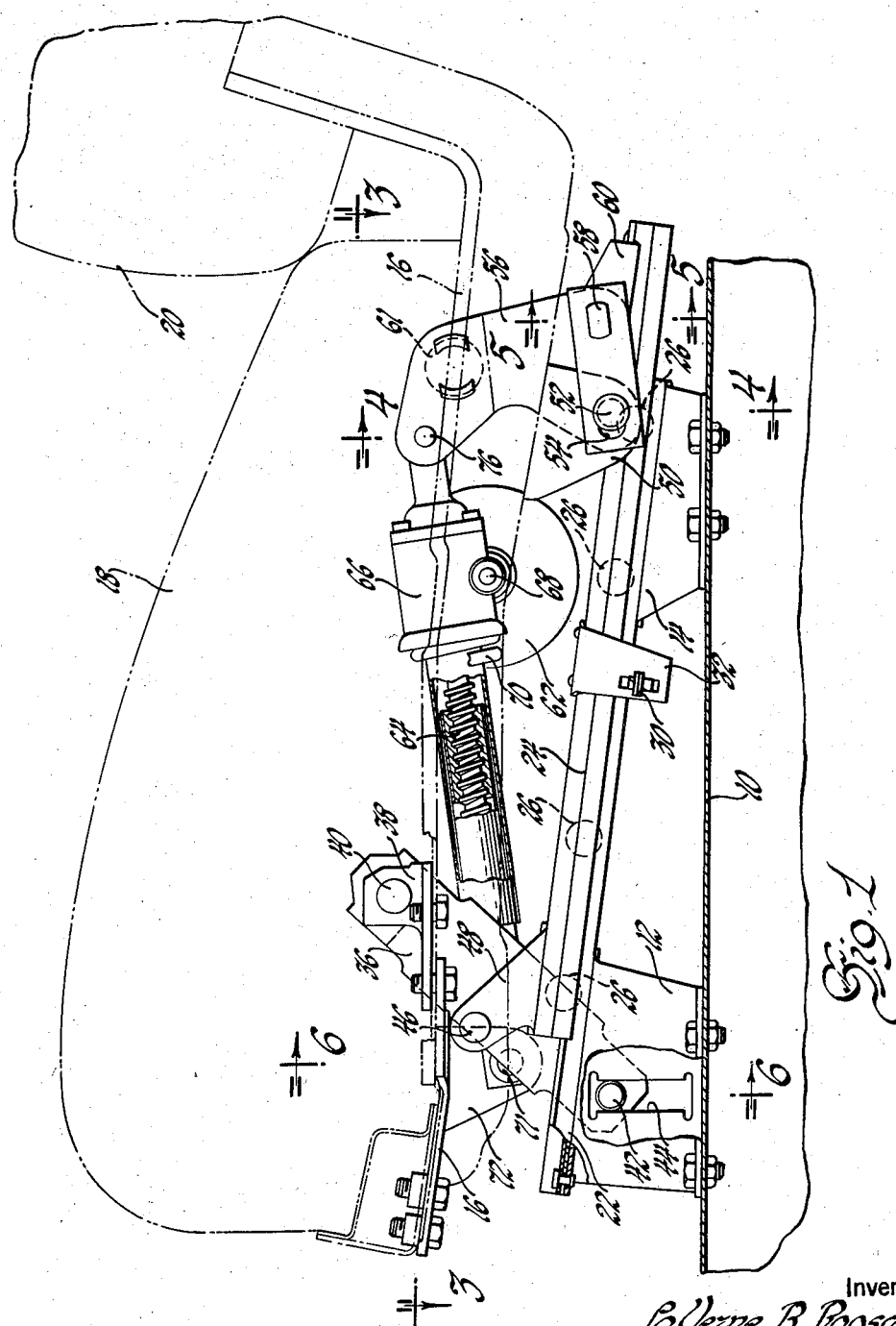
Fig. 1 is a fragmentary side elevational view, partly in section, showing an automobile seat having the novel seat adjuster with the seat being in a lowered position.

Automobile seats have for many years been provided with some form of fore and aft adjusting means so that the seat can be moved toward or away from the dashboard to accommodate occupants of different stature. In recent years a vertical adjusting means has been added in combination with the fore and aft adjuster. This invention provides an improved and simplified seat adjuster including a combination of vertical and fore and aft adjusting means. The fore and aft adjustment is on a forwardly and upwardly inclined track so that, as the seat moves forward, the front end of the seat is raised. By providing means for independently raising or lowering the rear side of the seat, in combination with this inclined track arrangement, the seat may be adjusted so that it is comfortable for people of different statures without using any independent vertical adjusting means for the front side of the seat. In addition, the vertical adjuster at the rear of the seat is of novel and improved construction.

Referring now more particularly to the drawings, 10 represents the floor of an automombile which mounts front floor supports 12 and rear floor supports 14 for a seat and its associated adjusting mechanism. The seat comprises a frame 16 carrying a seat cushion 18 and a seat back 20. In accordance with the invention, the seat is longitudinally movable on fore and aft adjusting means and the rear side of the seat is vertically movable about a pivotal axis located adjacent the front side of the seat. The seat adjusting mechanisms, with the exception of the motor means and the fore and aft latch control, are similar at opposite sides of the seat, and consequently, the mechanism at one side only will be described. Corresponding parts at the other side will be designated by reference numerals with a prime (').

Figure 4:
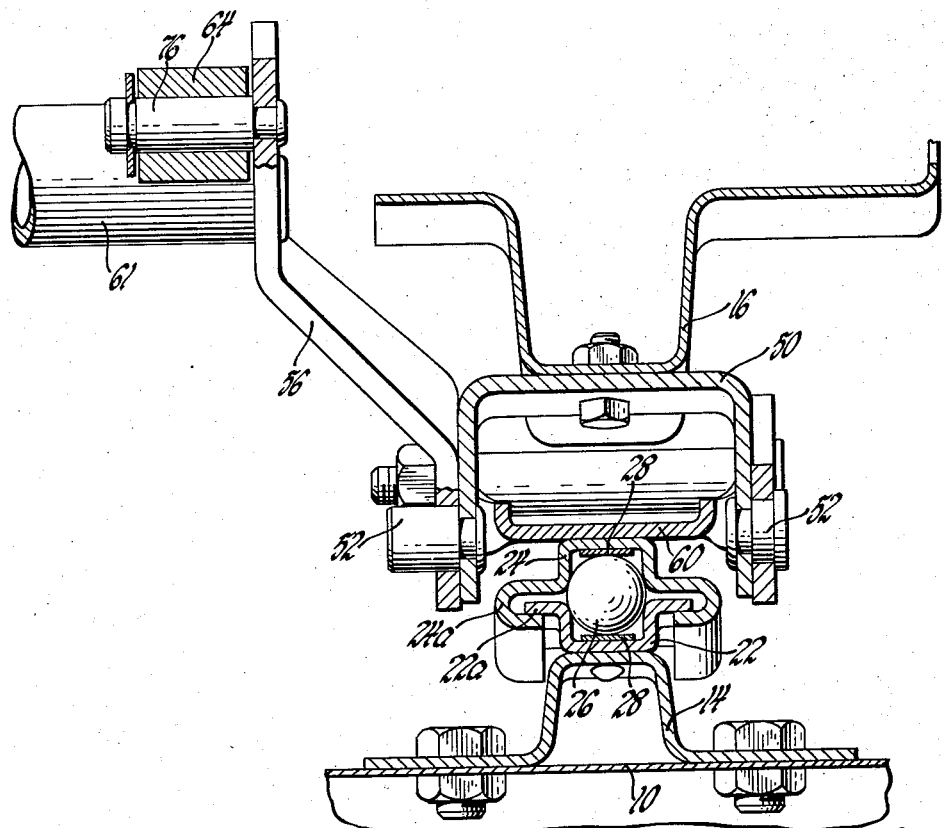
Fig. 4 is an enlarged vertical transverse section through one side of the seat adjuster taken along the line 4—4 of Fig. 1.
Figure 5:
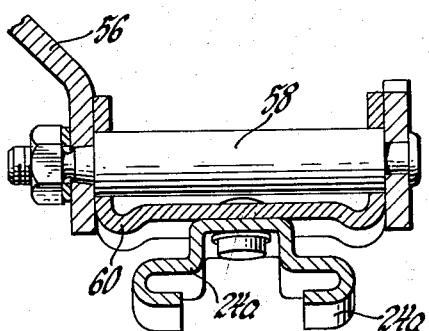
Fig. 5 is a detail section taken along the line 5—5 of Fig. 1.
Figure 6:
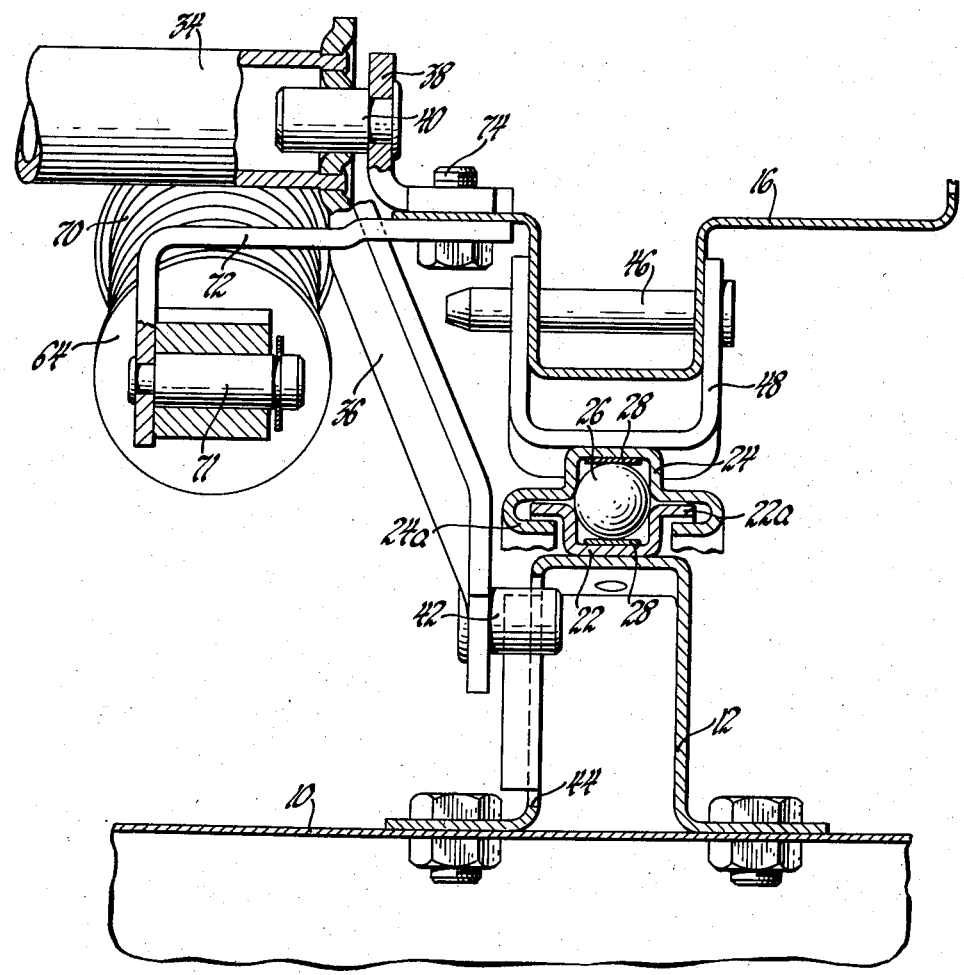
Fig. 6 is a transverse vertical section taken along the line 6—6 of Fig. 1.

A lower stationary rail or channel 22 is riveted to the front and rear floor supports 12, 14. This channel has oppositely directed side flanges 22a as shown best in Figs. 4 and 6. An upper movable inverted channel or rail 24 is mounted on the lower rail 22, having oppositely disposed U-shaped flanges 24a which straddle the flanges 22a of the lower channel member. A plurality of anti-friction balls 26 are carried between the channels, riding on hardened wear plates 28 in the base of each channel. Any conventional latching means (not shown) may be used to lock the channels together at a plurality of selected positions of fore and aft adjustment. A control handle 30 for the latch is carried on a support bracket 32 bolted to the upper channel, the handle having a conventional latching tooth adapted to engage in a selected one of a plurality of notches in the base of the lower channel 22 to lock the seat against fore and aft movement. A suitable latch is shown in the copending application of William B. Clark, filed September 22, 1954, as S. N. 457,710, assigned to the assignee of this application which issued on July 9, 1957, as Patent No. 2,798,532.

Figure 2:
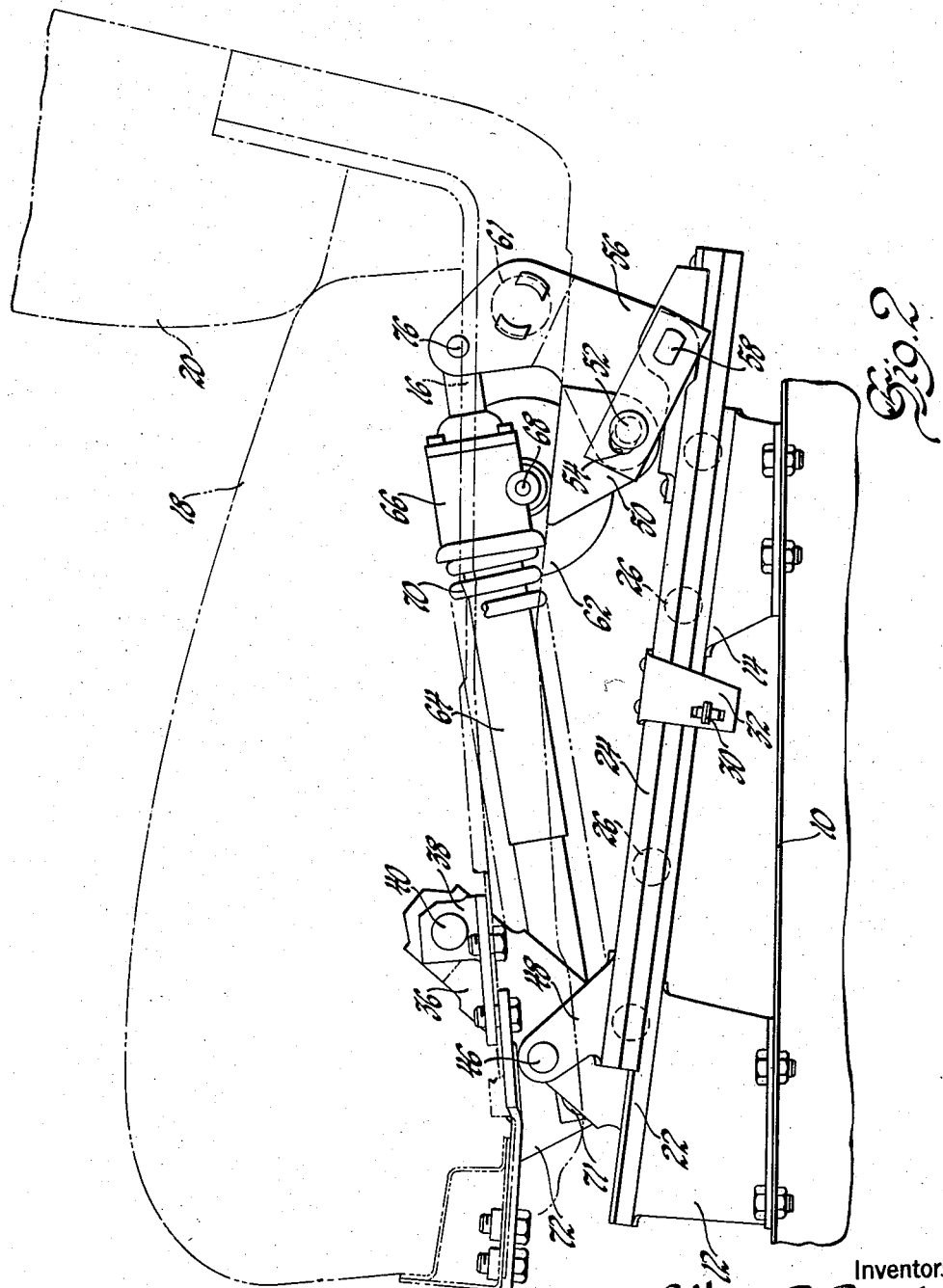
Fig. 2 is a fragmentary side elevation similar to Fig. 1 but with the rear side of the seat in raised position.
Figure 3:
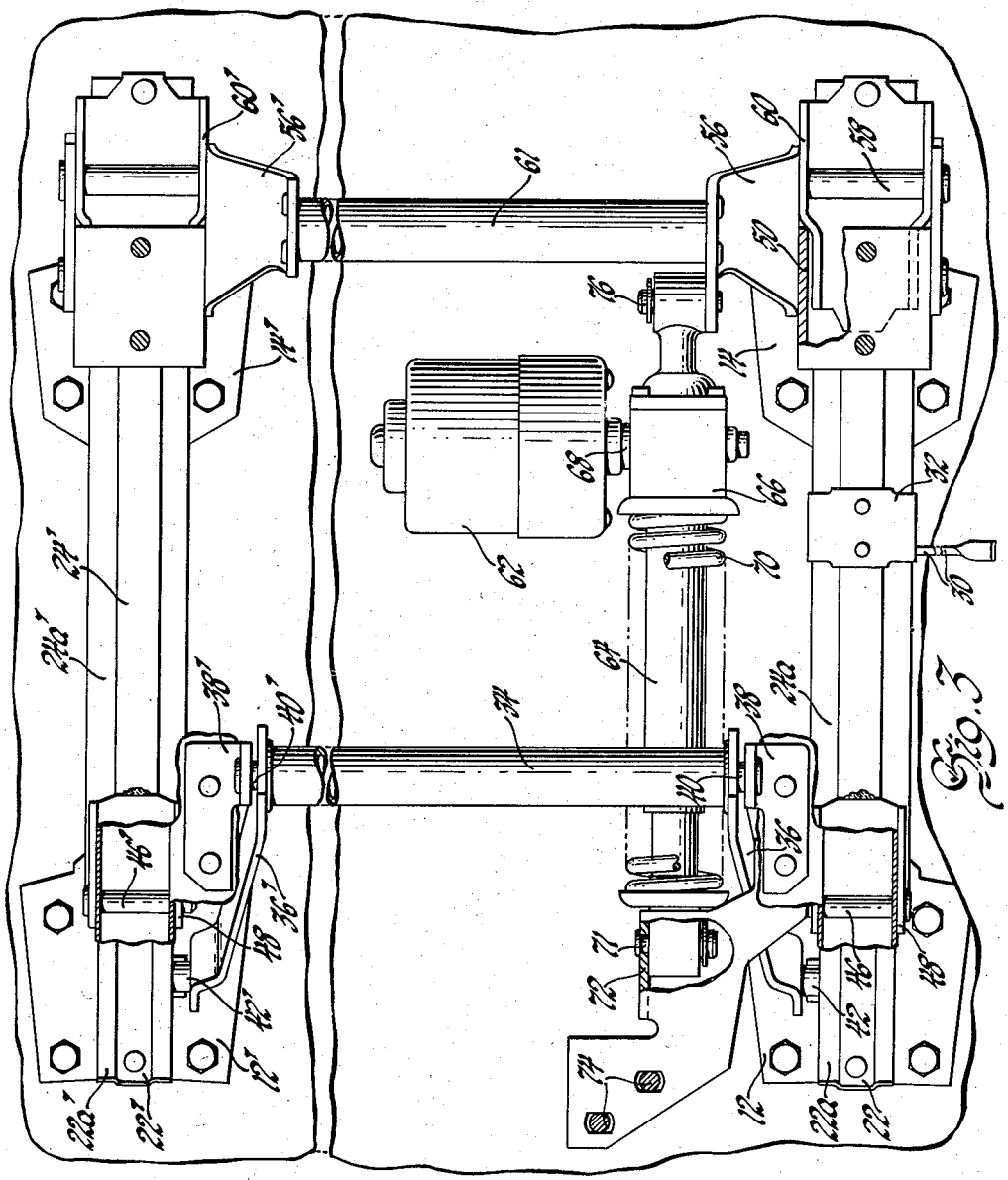
Fig. 3 is a generally horizontal section taken along the plane 3—3 of Fig. 1, the central portion of the seat and supporting structure being broken away.

As seen in Figs. 1 and 2, the fore and aft seat adjuster is inclined forwardly and upwardly so that as the seat moves forwardly, it moves upwardly as well. When the seat is occupied by a short person who requires the seat to be moved forwardly so that he can operate the foot controls more easily, the upward movement of the seat as it moves forward places the occupant in a comfortable position and eliminates the necessity of providing a separate vertical adjuster for the front side of the seat.

In order to tie opposite sides of the seat together and prevent cocking of the seat during fore and aft adjustment, there is a tie rod 34 pivotally connected at each end to the seat frame 16 and to a crank bracket 36 projecting from each front floor support 12. An angle bracket 38 is bolted to the seat frame 16 and the tie rod 34 is pivotally connected to the angle bracket by a stud 40. The lower end of the crank bracket 36 carries a stud 42 which is received in a vertical slot in the front floor support 12. As the seat moves forward, the stud 42 moves down in the slot 44.

The front side of the seat frame 16 is pivotally connected by a stud 46 to a bracket 48 projecting upwardly from the slidable channel 24.

The rear side of the seat frame is vertically movable. A bracket 50 which depends from the seat frame adjacent the rear of the seat cushion is connected through a pin and slot arrangement 52, 54 to one arm of a bell crank 56. The horizontally elongated slot 54 is necessary to permit arcuate movement of the seat frame around the axis of the stud 46 at the front side of the seat. The bell crank 56 is pivotally mounted at 58 on a support bracket 60 carried by the slidable channel 24. If the bell crank is pivoted in a clockwise direction from the position of Fig. 1 to the position of Fig. 2 the rear side of the seat frame will move upwardly. A tie rod 61 connects the bell cranks 56 and 56' at opposite sides of the seat.

The bell crank is operated through motor driven means comprising an electric motor 62 and a screw jack device 64 which is connected through a gear box 66 to the motor drive shaft 68. A coil spring 70 assists the motor in raising the rear side of the seat. The screw jack is pivotally connected at its front side by a stud 71 to a bracket 72 which is bolted at 74 to the seat frame. At the rear side the screw jack is pivotally connected at 76 to the bell crank 56.

In order to adjust the seat in fore and aft directions, it is merely necessary for the occupant to unlatch the seat lock by the control lever 30 and push with his body forwardly or rearwardly. When the desired position of adjustment is reached, the control lever may be released so that the seat will be locked in place against fore and aft movement. In order to raise or lower the back of the seat about the pivot 46, the motor 62, which is reversible, is operated through a conventional type of control switch (not shown) which preferably is located at one side of the seat. When the motor runs, the screw-jack is extended or retracted to swing the bell crank 56. Because of the sloping arrangement of the fore and aft seat adjuster, an independent vertical adjuster for the front side of the seat is not necessary and the combination of the forward and upward movement of the seat with the independent vertical adjusting means at the rear side of the seat provides a comfortable seating position for persons of different stature.

While we have shown and described one embodiment of our invention, it is capable of many modifications. Changes, therefore, in the construction and arrangement may be made without departing from the spirit and scope of the invention as set forth in the appended claims.

We claim:

1. A seat adjuster of the character described, comprising: a seat frame; floor support means; adjusting means mounting said seat frame on said floor support for fore and aft movement therealong, said adjusting means being inclined so that the seat frame moves upwardly as it moves forwardly; means pivotally connecting the front side of said seat frame to said adjusting means; a bell crank lever pivoted on said adjusting means adjacent the rear side of said seat frame; means pivotally connecting one portion of the bell crank lever to the seat frame adjacent the rear side thereof; and motor means connected between the seat frame and another portion of said bell crank lever for raising and lowering the rear side of said seat frame relative to the adjusting means.

2. Apparatus of the character claimed in claim 1, wherein the motor means comprises an electric motor driven screw jack having its front end connected to the seat frame and its rear end connected to said bell crank lever.

3. A seat adjuster of the character described, comprising: a seat frame; floor support means adjacent the front and rear sides of said seat frame; adjusting means mounting said seat frame on said floor support for fore and aft movement therealong including a stationary channel mounted on said floor support means, a movable channel mounted on said stationary channel, and anti-friction means between said channels, said channels being inclined so that the seat frame moves upwardly as it moves forwardly; means pivotally connecting the front side of said seat frame to said movable channel; a bell crank lever pivoted on said adjusting means adjacent the rear side of said seat frame; means pivotally connecting one arm of the bell crank lever to the seat frame adjacent the rear side thereof; and motor means comprising an electric motor driven screw jack having its front end connected to the seat frame and its rear end connected to another arm of said bell crank lever for raising and lowering the rear side of said seat frame relative to the adjusting means.

References Cited in the file of this patent
UNITED STATES PATENTS

| Number | Name | Date |
|---|---|---|
| 1,664,129 | Pallenberg | Mar. 27, 1928 |
| 2,124,754 | Simpson et al. | July 26, 1938 |
| 2,609,029 | Haberstump | Sept. 2, 1952 |
| 2,622,940 | Johnson | Dec. 23, 1952 |
| 2,641,305 | Oishei | June 9, 1953 |
| 2,798,532 | Clark | July 9, 1957 |

FOREIGN PATENTS

| Number | Country | Date |
|---|---|---|
| 518,018 | Great Britain | Feb. 15, 1940 |
| 749,732 | Great Britain | May 30, 1956 |